Patented Feb. 6, 1934

1,945,838

UNITED STATES PATENT OFFICE 1,945,838

METHOD OF MAKING GELS

William Vaughan, Mount Holly, N. J., assignor to The Permutit Company, New York, N. Y., a corporation of Delaware No Drawing. Application August 7, 1931
Serial No. 555,855

6 Claims. (Cl. 23—112)

This invention relates to making gels; and it comprises a method of making gels wherein dry, fine-powdered gel making reagents, such as silicate of soda and aluminate of soda, are intimately admixed in the proper proportions and the mixture wetted, the mixture at this time being ordinarily either granulated or pressed into a cake, and the mixture dried (being sometimes also baked) washed and redried; all as more fully hereinafter set forth and as claimed.

In the manufacture of gel preparations, it is usual to admix dilute solutions of the reagents to form a gel; this gel being afterwards pressed into a cake to get rid of some mother liquor, dried, washed and granulated. Dilute solutions are necessary to secure uniform admixture prior to gelling; to avoid local precipitation. There is advantage in this method since the volume of mother liquor retained, even with the highest practicable pressures in cake making, is still very large and the final dried product is correspondingly porous; offering a large reactive surface. Also, with the proper amount of drying and a suitable mother liquor, the cake disintegrates on washing, giving a good granular product without much waste in fines. On the other hand, the large volumes of reagents to be dealt with and the great amount of water to be evaporated, render the method costly in equipment and for fuel. Nor is the great porosity of the product always an advantage since it lessens strength and resistance to abrasion; both of which are necessary in a pervious bed softener. Further, great porosity is not always desirable, since interior surfaces are slower acting than exterior. In softening water and regenerating zeolites, interior surfaces must be reached by capillary flow.

In making zeolites by wet methods, the usual reagents are aluminate of soda and silicate of soda. Using these in 4° to 5° Bé. solutions at the ordinary temperature, about 10 minutes time is afforded for perfecting admixture before gelling begins and the mixture sets to a jelly. In this jelly, the mother liquor is a solution of caustic soda containing some silica. This jelly is pressed and dried. In drying the press cake the alkali concentration rises and with it the solvent power for silica so that in washing, a large amount of silica is removed. This represents a waste of silicate of soda. Aluminate of soda is sometimes replaced by sulfate of alumina, giving a mother liquor containing sodium sulfate. This however is only practical where high silica ratios in the zeolite are desirable, as they sometimes are.

In the present invention, a harder and stronger but less porous gel is made in a more economical manner by intimately admixing dry finely powdered reagents and then producing reaction by water or steam. The mixture may be made into granules prior to or during wetting; or it may be confined and hydrated as a cake. In the latter event, high pressures may develop because of swelling and a dense product results. In granulating, pill making processes and apparatus may be used. If a blending liquid is desired, it is possible to use gasoline or kerosene; these being evaporated off prior to wetting the granules. Where reagents not very soluble in cold water are employed, as in the case of high silica water glass, wetting is best done with exhaust steam.

Mixing may be effected in any convenient way. Grinding the mixture in a ball mill is sometimes desirable. It is convenient to have one of the powders to be mixed of a dark color. For example, for the aluminate of soda there may be used the product of sintering a mixture of bauxite and soda ash on a sintering machine. This aluminate is dark colored because of the iron present.

Example 1.—In a practical embodiment of the present invention making a zeolite corresponding approximately to $Na_2O.Al_2O_3.2SiO_2$, spray dried silicate of soda containing 100 parts $SiO_2$ with about 31 parts $Na_2O$ and in fine powder form is mixed with dry commercial sodium aluminate containing about 50 parts $Al_2O_3$ and 34 parts $Na_2O$. The mixture is ground in a ball mill until homogeneous and is then placed in perforated steel molds capable of resisting pressure. The mixture is tamped into the molds to fill them as completely as possible.

The filled mold is then exposed to a current of exhaust steam until air is displaced and hydration begins. The filled mold is thoroughly wet by condensation of the wet steam and it is then put to one side to allow reactions to develop. A period of 4 to 5 hours is desirable and standing over night is better. The mold is kept wet during this period. The cake is then air dried; which is best done with warm air. The temperature should not be allowed to go above 80° C. The cake may be removed from the mold prior to drying or it may be dried in the mold. In either event the cake is next washed until the bulk of the excess alkali is removed and is then dried sufficiently for shipment and handling.

Example 2.—In another embodiment of this invention, a dry mixture is made of 100 parts of silica as commercial dry sodium metasilicate ($Na_2SiO_3$) and 42 parts of alumina as dry commercial aluminum sulfate. The dry mixture is made as before and otherwise treated as stated. The final gel zeolite in this case is approximately $Na_2O Al_2O_3 4SiO_2$.

*Example 3.*—Spray dried water glass containing 100 parts $SiO_2$ and 31 parts $Na_2O$, dry commercial aluminum sulfate containing 51.5 parts $Al_2O_3$ and 113 parts $SO_3$ and 162 parts dry soda ash are mixed, ground, pressed, steamed and washed as before to produce a zeolite gel having a composition corresponding approximately to $$Na_2O.Al_2O_3.3SiO_2.$$

Evolution of $CO_2$ during the steaming produces a desirable type of porosity.

*Example 4*

| | |
|---|---|
| Spray dried silicate | 100 parts $SiO_2$ |
| Aluminum sulfate | 15 parts $Al_2O_3$ |
| Sodium aluminate | 15 parts $Al_2O_3$ |
| Soda ash | 16 parts |
| Gel zeolite | 1:1:5 |

What I claim is:—

1. A process of making gels from solid reagents which comprises intimately mixing the reagents in dry powder form, moistening the dry mixture with water, allowing the moist mixture to stand, then drying said mixture and washing it with water.

2. A process of making gels from solid reagents which comprises intimately mixing the reagents in dry powder form, steaming the dry mixture at a temperature around 100° C., moistening and aging the steamed mixture, then drying said mixture at about 80° C. and washing it with water.

3. A process of making a water softening zeolite gel which comprises intimately mixing dry powdered silicate of soda with a dry powdered water soluble compound of alumina, steaming the dry mixture, moistening with water and aging said mixture and then drying and washing it with water.

4. A process of making a water softening zeolite gel from silicate of soda and one or more soluble compounds of alumina which comprises mixing the reagents in a dry finely powdered condition and subjecting a mass of the dry mixture to the action of moisture until moisture penetrates the mass and causes reaction throughout the mass.

5. A process of making a water softening zeolite gel from silicate of soda and one or more soluble compounds of alumina which comprises mixing the reagents in a dry finely powdered condition, subjecting a mass of the dry mixture to the action of moist steam until moisture penetrates the mass and causes reaction throughout the mass, subsequently drying the moist mixture and washing the dried material with water.

6. A process of making a water softening zeolite gel from silicate of soda and one or more soluble compounds of alumina which comprises mixing the reagents in a dry finely powdered condition, subjecting a mass of the dry mixture to the action of steam and of water, allowing the wet mass to stand, subsequently drying the wet mass and washing the dried material with water.

WILLIAM VAUGHAN.